United States Patent Office 3,251,889
Patented May 17, 1966

3,251,889
PREPARATION OF 3-TRIFLUOROMETHYL-4-NITROPHENOL
Marshall Kulka, Guelph, Ontario, Canada, assignor to United States Rubber Company, New York, N.Y., a corporation of New Jersey
No Drawing. Filed Apr. 6, 1961, Ser. No. 101,064
2 Claims. (Cl. 260—622)

This invention relates to a method of preparing aromatic phenols having the general formula,

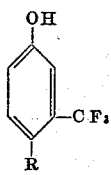

wherein R is a hydrogen or halogen atom, or an alkyl, aryl or nitro radical. More particularly, the invention relates to an improved method of converting certain 3-(trifluoromethyl)-anilines to corresponding 3-(trifluoromethyl)-phenols.

The conventional method of converting an aromatic amine ($ArNH_2$) to a phenol ($ArOH$) comprises diazotization of the aromatic amine with sodium nitrite in acid solution, followed by hydrolysis, such as adding the diazonium salt ($ArN=NX$) solution resulting from the diazotization step to boiling saturated aqueous copper sulfate solution. The resulting phenols are generally obtained in poor yields and are usually impure due to accompanying side reactions.

It is an object of this invention to prepare 3-(trifluoromethyl)-phenols having a hydrogen or halogen atom, or an alkyl, aryl or nitro radical in the 4-position. A further object is to prepare said phenols from corresponding 3-(trifluoromethyl)-anilines. Still another object is to provide a new process for the preparation of said phenols in satisfactory yields with a minimum of side reactions. Other objects will appear hereinafter.

These objects are accomplished by the present invention wherein 3-(trifluoromethyl)-anilines are diazotized in acid solution with sodium nitrite followed by the hydrolysis of the resulting diazonium salt solution by adding it to a boiling mixture of xylene and aqueous copper sulfate solution to form corresponding 3-(trifluoromethyl)-phenols.

By using the xylene-copper sulfate mixture of this invention, exceptionally high yields of 3-(trifluoromethyl)-phenols have been obtained. Other advantages are that less copper sulfate is used, there is good control of the reaction, and a purer product is obtained. Although the exact function of xylene in this reaction is not known, it may be that the xylene extracts the resulting phenols as it is formed, thereby preventing it from entering into undesirable side reactions. However, it does not seem to be solely a solvent effect, since it has been found that the substitution of other related organic solvents, such as toluene, chlorobenzene and nitrobenzene for xylene gave poor results. It has also been found that the process of the subject invention is not suitable as a general method for the conversion of anilines to phenols by way of diazotization and hydrolysis. For example, when it was applied to the conversion of m-nitroaniline to m-nitrophenol, a poor yield of m-nitrophenol was obtained with a high percentage of tar. A similarly poor yield was noted when this process was applied to the conversion of 3,4-dimethoxyaniline to the corresponding phenol. It appears, therefore, that the instant invention is peculiarly suitable for the conversion of trifluoromethyl-anilines to trifluoromethyl-phenols.

The reactions, to the latter one of which this invention is directed, may be illustrated by the following equation:

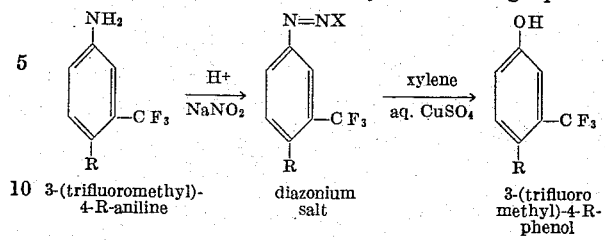

3-(trifluoromethyl)-4-R-aniline    diazonium salt    3-(trifluoromethyl)-4-R-phenol wherein R is a hydrogen or halogen atom, or an alkyl, aryl or nitro radical.

As the halogen atom, the group R may be chlorine or bromine; as the alkyl radical, R may be straight or branched chain, saturated hydrocarbons having from 1 to 12 carbon atoms, exemplified by methyl, ethyl, propyl, butyl, hexyl, dodecyl, isobutyl, and similar radicals; as the aryl radical, R may be a phenyl, naphthyl or alkyl substituted phenyl and naphthyl radical, the alkyl substituent being as described above.

For every mole of aniline reactant converted, as little as 100 ml. of xylene and 10 g. of copper sulfate pentahydrate may be used. Although larger quantities of each may be used without limit, the preferable range is 1000–3000 ml. of xylene and 100–400 g. of copper sulfate pentahydrate per mole of aniline reactant converted.

The following examples illustrate in more detail the practice of the invention.

Example 1

This example illustrates the preparation of 3-trifluoromethyl-phenol, a valuable intermediate in chemical syntheses.

A solution of 3-(trifluoromethyl)-aniline (50 g.) in water (300 ml.) and concentrated sulfuric acid (50 ml.) was cooled to 5° C. and diazotized with a solution of sodium nitrite (22 g.) in water (50 ml.). The reaction mixture was stirred at 5° C. for one hour, the excess nitrite was destroyed with urea (0.5 g.), and then the solution was added during one hour to a stirred and boiling mixture of xylene (300 ml.) and copper sulfate pentahydrate (10 g.) in water (25 ml.). After heating for an additional one-half hour with stirring, the xylene layer was separated and extracted with dilute aqueous sodium hydroxide. The alkaline extract was acidified and was then extracted with benzene; the solvent was thereafter removed by distillation. The residual 3-(trifluoromethyl)-phenol boiled at 66–67° (11 mm.). The yield was 38 g. or 75% of the theoretical yield.

In comparison, when xylene is not used, a 64% yield of 3-(trifluoromethyl)-phenol is reported by Swarts, Bull. Acd. Roy. Belg., 113, 241 (1913); C.A. 8, 680 (1914), from the diazotization of 3-(trifluoromethyl)-aniline and hydrolysis with dilute $H_2SO_4$.

Example 2

Following the procedure outlined in Example 1, high yields of 3-(trifluoromethyl)-4-halo-phenols were obtained from the corresponding 3-(trifluoromethyl)-4-halo-anilines, wherein the hali group was chlorine or bromine.

Example 3

Following the procedure outlined in Example 1, high yields of 3-(trifluoromethyl)-4-alkyl-phenols were obtained from the corresponding 3-(trifluoromethyl)-4-alkyl-anilines, wherein the alkyl group was a methyl, ethyl, isobutyl, hexyl or dodecyl radical.

Example 4

Following the procedure outlined in Example 1, high yields of 3-(trifluoromethyl)-4-aryl-phenols were obtained from the corresponding 3-(trifluoromethyl)-4-aryl-anilines, wherein the aryl group was a phenyl, naphthyl or p-tolyl radical.

*Example 5*

This example illustrates a method of preparing 3-(trifluoromethyl)-4-nitro-aniline, a starting material for the subject invention.

To a solution of conc. sulfuric acid (50 ml.) and water (50 ml.) was added 3-(trifluoromethyl)-4-nitro-acetanilide (10.0 g.). The reaction mixture was heated on a steam bath for 2 hours in order to hydrolyze the 3-(trifluoromethyl)-4-nitro-acetanilide to 3-(trifluoromethyl)-4-nitro-aniline.

Although alkaline as well as acid hydrolysis of 3-(trifluoromethyl)-4-nitro-acetanilide may be used, acid hydrolysis is preferred since this avoids any necessity for the extra step of isolating the resulting aniline. The acid solution resulting from this example may now be used directly in the conversion of the aniline to the phenol, as shown in Example 6.

*Example 6*

This example illustrates the preparation of 3-(trifluoromethyl)-4-nitro-phenol, which is used as a lampreycide for controlling the larva of the sea lamprey, a fish parasite.

The resulting solution of 3-(trifluoromethyl)-4-nitro-aniline in Example 5 was quickly cooled to 0° C. (in order to obtain small crystals) with stirring and the slurry was diazotized at 0° C. to form the corresponding diazonium salt by dropwise addition of sodium nitrite (3.0 g.) in water (20 ml.). The solution was allowed to stand at 0–5° C. for one hour and then was treated with a solution of urea (0.3 g.) in water (5 ml.) in order to destroy any excess of nitrous acid. The resulting clear solution of the diazonium salt was added dropwise during one hour to a stirred and boiling mixture of xylene (150 ml.) and copper sulfate pentahydrate (20 g.) in water (50 ml.). The light-colored reaction mixture was heated under reflux and stirred for an additional 15 minutes and partly cooled. The xylene layer was separated, washed with a little water and the solvent removed by distillation. The residue, which solidified on cooling, distilled at 150–180° C. (1 mm.), and the distillate (7.4 g. or 90%), on crystallization from benzene-petroleum ether, yielded light-yellow crystals of 3-(trifluoromethyl)-4-nitro-phenol, M.P. 76–79°. The yield was 6.88 g. or 83% of the theoretical yield.

The acid-copper sulfate solution, on concentration in vacuo on the steam bath to about one-half of the original volume and cooling, yielded 15 g. of copper sulfate which could be used over again.

In repeating the experiment with 10 g. of copper sulfate instead of 20 g., the yield of 3-trifluoro-4-nitro-phenol was 77% of the theoretical yield. When the amount of copper sulfate used was reduced further to 6 g., the yield was 69% of the theoretical yield.

In comparison, when xylene is not used, a 50% yield of 3-(trifluoromethyl)-4-nitro-phenol was obtained from the conventional method of converting aromatic amines to phenols.

Having thus described my invention, what I claim and desire to protect by Letters Patent is:

1. A method of preparing 3-(trifluoromethyl)-4-nitrophenol comprising hydrolyzing a diazonium salt of 3-(trifluoromethyl)-4-nitro-aniline with a boiling mixture of at least 100 ml. of xylene and at least 10 g. of copper sulfate pentahydrate in aqueous solution per gram-mole of said 3-(trifluoromethyl)-4-nitroaniline converted, and subsequently recovering said 3-(trifluoromethyl)-4-nitrophenol.

2. A method of preparing 3-(trifluoromethyl)-4-nitrophenol comprising hydrolyzing a diazonium salt of 3-(trifluoromethyl)-4-nitro-aniline with a boiling mixture of from about 1000 ml. to about 3000 ml. of xylene and from about 100 g. to about 400 g. of copper sulfate pentahydrate in aqueous solution per gram-mole of said 3-(trifluoromethyl)-4-nitro-aniline converted, and subsequently recovering said 3-(trifluoromethyl)-4-nitro-phenol.

References Cited by the Examiner

UNITED STATES PATENTS 1,910,679   5/1933   Crawford et al. _____ 260—621

FOREIGN PATENTS 585,105   11/1959   Belgium.
667,229   7/1963   Canada.
1,241,613   8/1960   France.

OTHER REFERENCES

Mooradian et al., Jour. Amer. Chem. Soc., vol. 73 (1951), pages 3470–72 (3 pages).

Whalley, Jour. Chem. Soc. London, pages 3016–20 (1949).

LEON ZITVER, *Primary Examiner.*

CHARLES B. PARKER, LORRAINE A. WEINBERGER, *Examiners.*

H. G. MOORE, J. E. EVANS, *Assistant Examiners.*